United States Patent
Henning et al.

(10) Patent No.: US 8,682,799 B1
(45) Date of Patent: Mar. 25, 2014

(54) METHOD AND SYSTEM FOR PORT LICENSING IN SWITCHES

(75) Inventors: Jeffrey E. Henning, Elko, MN (US); John P. Wagner, Minnetonka, MN (US); Craig R. Stubbins, Eden Priarie, MN (US); Michael C. Walton, Savage, MN (US); Patrick J. Tansey, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1770 days.

(21) Appl. No.: 11/318,116

(22) Filed: Dec. 23, 2005

(51) Int. Cl.
G06Q 99/00 (2006.01)

(52) U.S. Cl.
USPC ............... 705/59; 710/100; 713/1; 713/100; 719/310

(58) Field of Classification Search
USPC ......... 705/50–51, 59; 709/223–226; 710/100; 713/1, 100; 719/310
See application file for complete search history.

(56) References Cited

U.S. PATENT DOCUMENTS

| | | | |
|---|---|---|---|
| 6,333,938 B1 * | 12/2001 | Baker | 370/503 |
| 6,430,626 B1 * | 8/2002 | Witkowski et al. | 709/249 |
| 6,941,357 B2 * | 9/2005 | Nguyen et al. | 709/220 |
| 7,111,102 B2 * | 9/2006 | Doak et al. | 710/305 |
| 7,117,276 B2 * | 10/2006 | Maeda et al. | 710/36 |
| 7,334,033 B2 * | 2/2008 | Stimac | 709/224 |
| 7,370,013 B1 * | 5/2008 | Aziz et al. | 705/40 |
| 7,406,509 B2 * | 7/2008 | Meneghini et al. | 709/217 |
| 7,603,453 B1 * | 10/2009 | Bali et al. | 709/223 |
| 2003/0149695 A1 * | 8/2003 | Delaire et al. | 707/10 |
| 2003/0163727 A1 * | 8/2003 | Hammons et al. | 713/201 |
| 2003/0179227 A1 * | 9/2003 | Ahmad et al. | 345/736 |
| 2005/0114474 A1 * | 5/2005 | Anderson et al. | 709/220 |
| 2005/0149651 A1 * | 7/2005 | Doak et al. | 710/52 |
| 2005/0188060 A1 * | 8/2005 | Meneghini et al. | 709/220 |
| 2005/0213440 A1 * | 9/2005 | Goodman et al. | 369/30.27 |
| 2006/0233164 A1 * | 10/2006 | Brahmaroutu et al. | 370/384 |
| 2007/0038679 A1 * | 2/2007 | Ramkumar et al. | 707/200 |
| 2007/0058619 A1 * | 3/2007 | Gopal Gowda et al. | 370/386 |
| 2007/0078984 A1 * | 4/2007 | Abei | 709/226 |
| 2007/0094147 A1 * | 4/2007 | Fukui et al. | 705/59 |

* cited by examiner

*Primary Examiner* — James D Nigh
(74) *Attorney, Agent, or Firm* — Klein, O'Neill & Singh, LLP (57) ABSTRACT

Method and system for setting port licenses in a switch is provided. The method includes receiving a command from a user for adding a license for a port; reading a licensing table; checking if a maximum port licensing number is exceeded; and modifying the licensing table, wherein licensing values are modified to grant a license to the user for the port. The system includes a licensing table containing port licensing information; and a firmware that adds a license to a port when a device is attached to a port.

8 Claims, 10 Drawing Sheets

METHOD AND SYSTEM FOR PORT LICENSING IN SWITCHES

BACKGROUND

1. Field of the Invention

This invention relates in general to the field of networking, and more specifically, to port licensing in switches.

2. Background of the Invention

A switch is used in networking for routing data between devices attached to the switch. A switch contains multiple ports that are internally connected by a cross bar. Each port checks for a license using a license key associated with the port, when a device is attached to the port. Devices can be server blades, host bus adapters (HBA) or other storage controllers. If a license is available, then the switch and the devices can use the port.

Typically, switch ports are licensed during the manufacturing process. A user can only use a licensed port and is typically not allowed to change the port license or overall port-license configuration. Therefore, there is a need for a method and system that allows a user to dynamically change the overall port-licensing configuration after the manufacturing process while a switch is being used or otherwise.

SUMMARY OF THE INVENTION

In one aspect of the present invention, a method for configuring port licenses is provided. The method includes, receiving a command from a user for adding a license for a port; reading a licensing table; checking if a maximum port licensing number is exceeded; and modifying the licensing table, wherein licensing values are modified to grant a license to the user for the port.

In another aspect of the present invention, a switch element is provided. The switch element includes a licensing table containing port licensing information; and a processor executing firmware that receives a command from a user for adding a license to a port; checks if a maximum port licensing number is exceeded; and modifies the licensing table by setting licensing values to grant a license to the user for the port.

In another aspect of the present invention, a dynamic method for configuring port licenses is provided. The method includes attaching devices to a switch; reading a licensing table; checking if a maximum port licensing number is exceeded; and modifying the licensing table, wherein licensing values are modified to grant a license to the user for the port.

In yet another aspect of the present invention, a switch element is provided. The switch element includes a licensing table containing port licensing information; and a processor executing firmware that adds a license to a port when a device is attached to the port; checks if a maximum port licensing number is exceeded; and modifies the licensing table by setting licensing values to grant a license to the user for the port.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided for convenience as they are typically (but not exclusively) used in the Fibre Channel environment, implementing the various adaptive aspects of the present invention.

"F_Port": A port to which non-loop N_Ports are attached to a fabric and does not include FL_ports.

"Fibre Channel ANSI Standard" ("FC-FS-2"): The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"License Key": A software or hardware feature that enables a user to use a switch port. The license key is typically provided by a switch manufacturer or an authorized third party and can be downloaded from a remote computer by a user.

"N_Port": A direct fabric attached port, for example, a disk drive or a HBA.

"NL_Port": A L_Port that can perform the function of a N_Port.

"Port License": A license associated with a port that enables a user to use the port.

To facilitate an understanding of the preferred embodiment, the general architecture and operation of a Fibre channel System and a Fibre Channel switch element will be described. It is noteworthy that the Fibre channel System and Fibre Channel switch element described below may not be construed as a limitation. The operation and general architecture of the preferred embodiment can be accomplished by a switch as explained in FIG. 1E. The specific architecture and operation of the preferred embodiment will then be described with reference to the general architecture.

Fibre Channel System:

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

Fibre Channel fabric devices include a node port or "N_Port" that manages fabric connections. The N_port establishes a connection to a fabric element (e.g., a switch) having a fabric port or "F_port".

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Figure 1A:
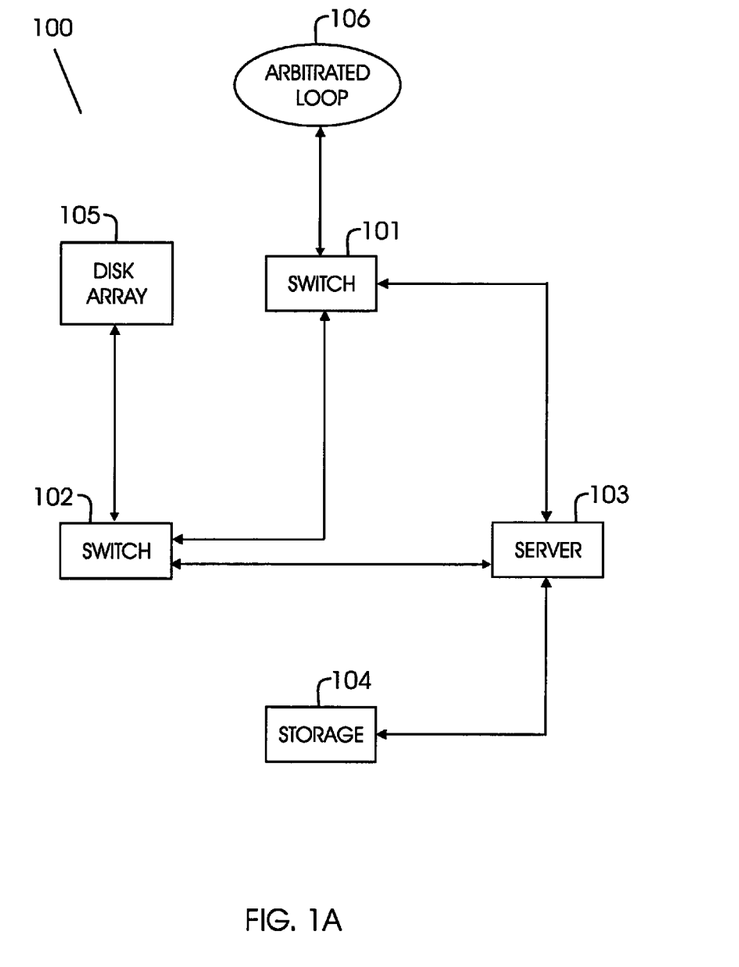
FIG. 1A shows an example of a network system used according to one aspect of the present invention.

Turning to FIG. 1A, a block diagram of a fibre channel system 100 implementing the methods and systems in accordance with the adaptive aspects of the present invention. System 100 includes plural devices that are interconnected is shown. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switches 101 and 102. An arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 1B:
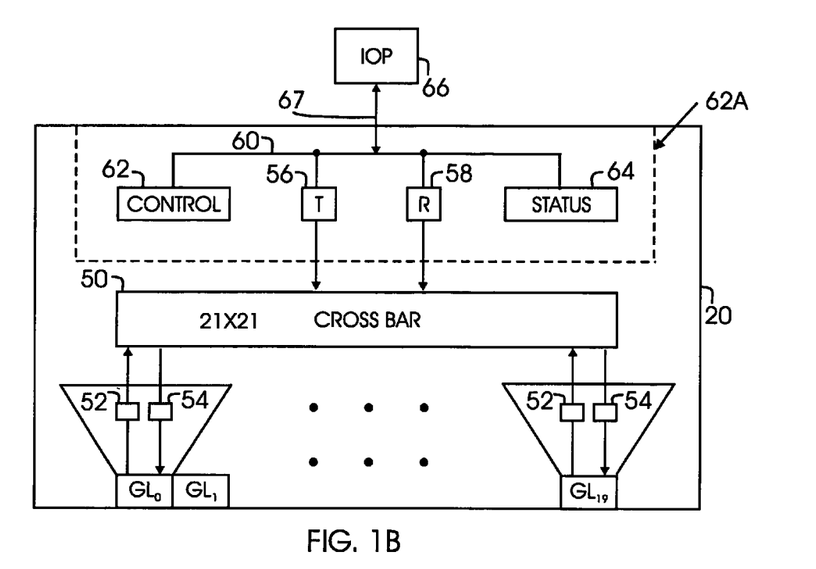
FIG. 1B shows an example of a Fibre Channel switch element, according to one aspect of the present invention.

Fibre Channel Switch Element:

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) service and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 is comprised of transmit and receive connections to switch crossbar 50. Within each port, one connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

In the preferred embodiments of switch chassis described herein, the fabric controller is a firmware-programmed microprocessor, also referred to as the input/output processor ("IOP"). As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

Figure 1C:
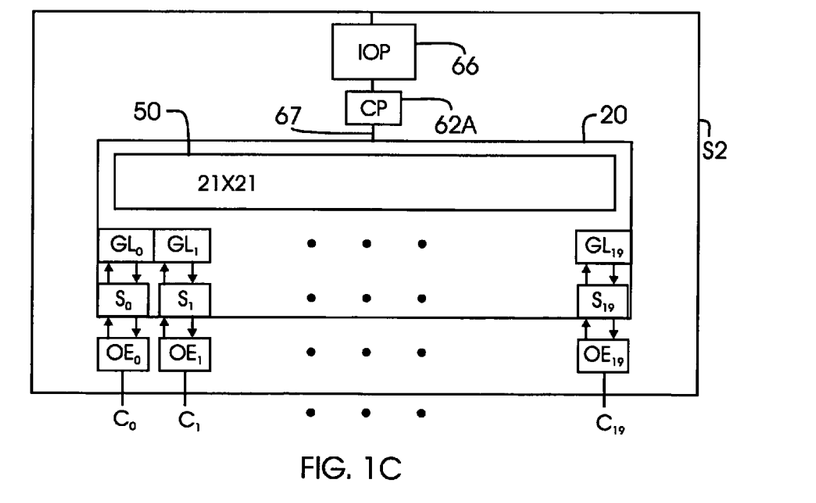
FIG. 1C shows a block diagram of a 20-channel switch chassis, according to one aspect of the present invention.

FIG. 1C shows a 20-channel switch chassis S2 using ASIC 20 and IOP 66. IOP 66 in FIG. 1C is shown as a part of a switch chassis utilizing one or more of ASIC 20. S2 will also include other elements, for example, a power supply (not shown). The 20 GL_Ports correspond to channels C0-C19. Each GL Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
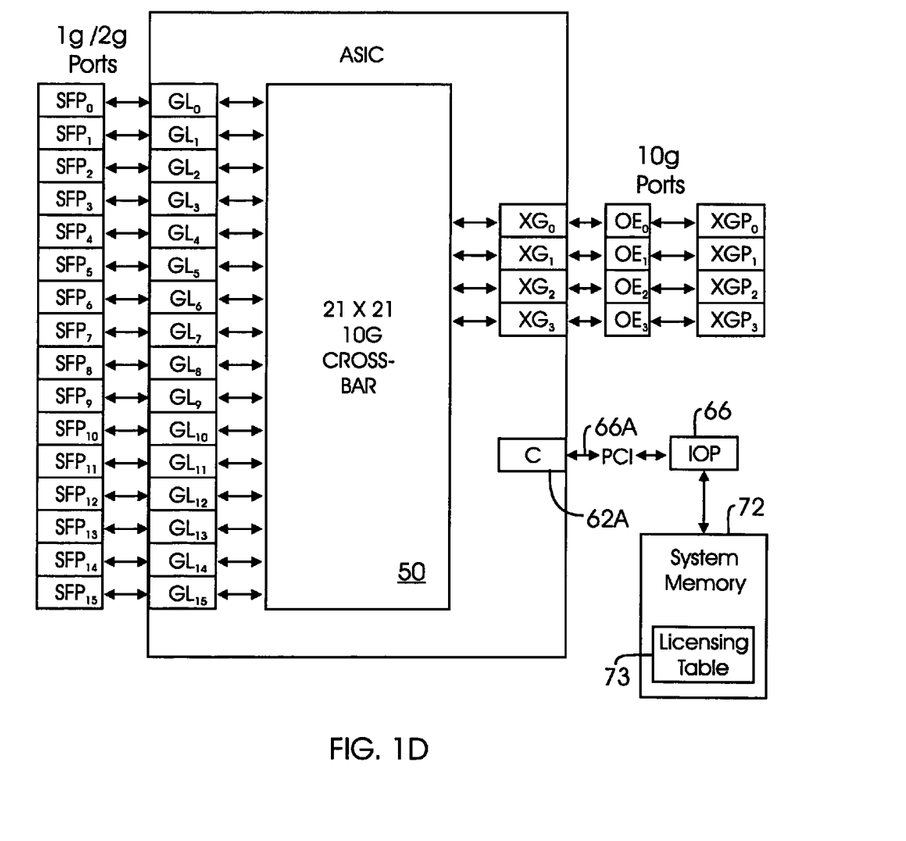
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A. The IOP 66 performs operations using information stored in a system memory 72. A licensing table 73 that contains port licensing information is also part of the system memory 72.

Figure 1E:
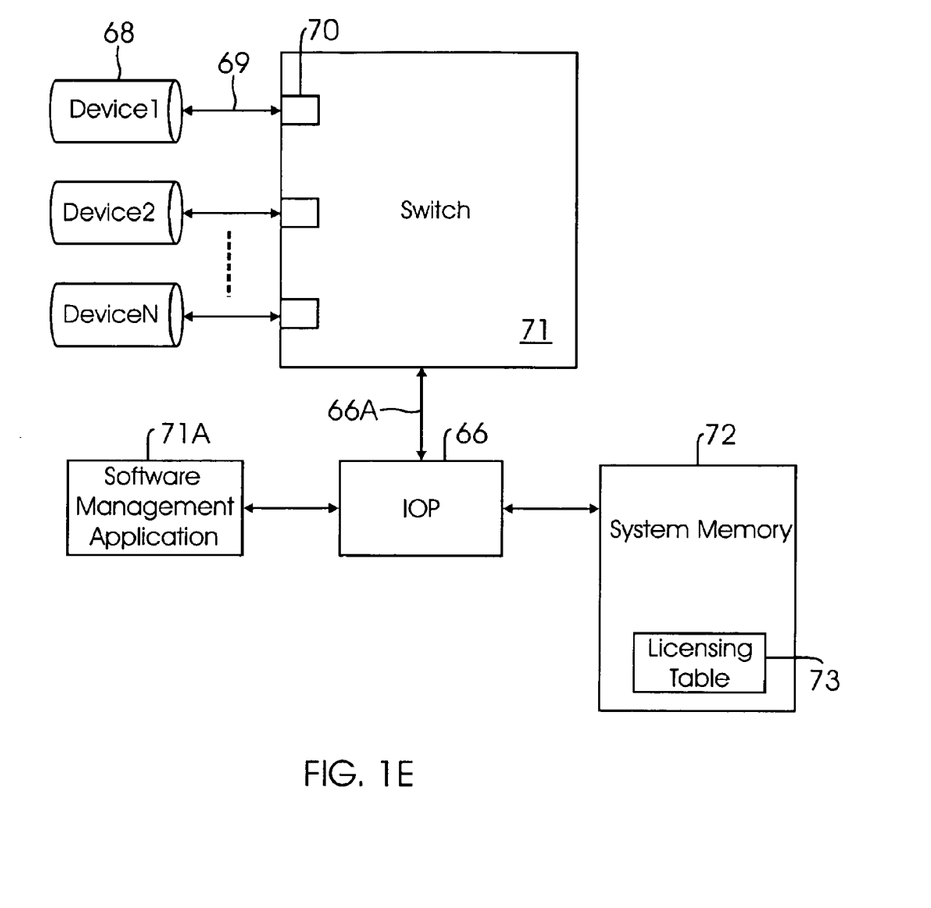
FIG. 1E shows a block diagram of a networking system, according to one aspect of the present invention.

Networking Switch Element:

FIG. 1E shows a block diagram of a networking system using a network switch 71, according to one aspect of the present invention. Switch 71 can be an Ethernet or a Fibre Channel switch depending on the type of environment.

Networking switch 71 includes multiple I/O ports 70 and is coupled to IOP 66 though PCI bus 66A. Although a PCI bus is used in the preferred embodiment of the present invention, any general-purpose bus can be used for transferring data between IOP 66 and I/O ports 70. Plural devices 68 are connected to ports 70 through a physical link 69. The physical link can be a copper or an optical link. System memory 72 is connected to IOP 66 through a general-purpose bus (not shown). System memory 72 stores licensing table 73, which maintains information regarding port licensing as described below with respect to FIG. 3. System memory 72 also maintains an image of the firmware that is used by IOP 66 to control and operate switch 71.

Software management application 71A is a software program that operates on a computing system to manage network elements, for example, switch 71. Application 71A provides a user interface to manage/configure the network elements and used to change port configuration, according to one aspect of the present invention, as described below.

Figure 2A:
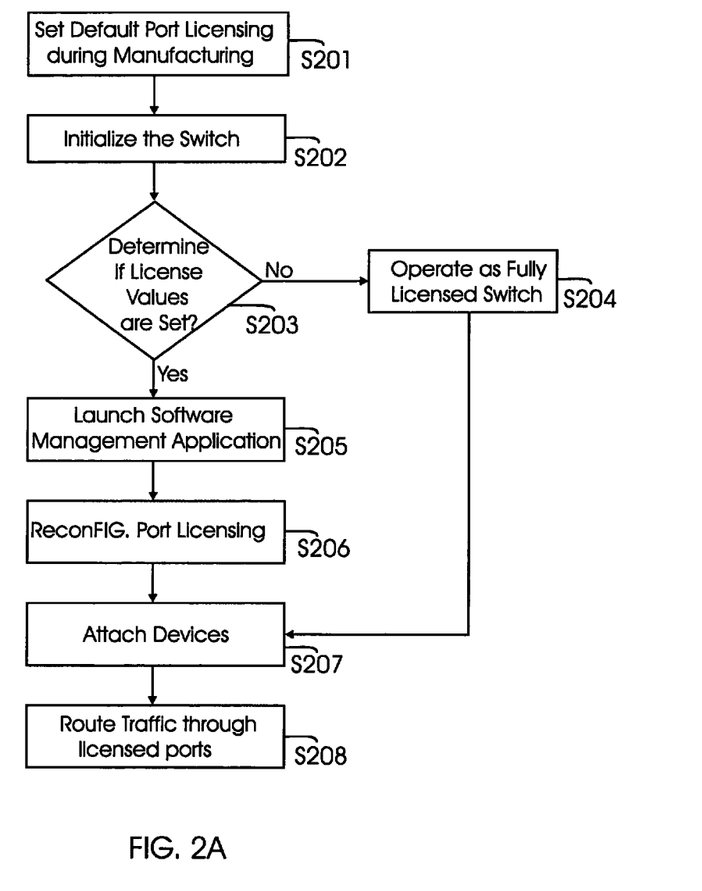
FIG. 2A shows a top-level flow chart for configuring port licenses in a switch, according to one aspect of the present invention.

Process Flow for Overall Port Licensing Configuration:

FIG. 2A shows a top-level process flow diagram for configuring port licenses in a switch, according to one aspect of the present invention. Turning in detail to FIG. 2A, in step S201, default port licensing values are set in licensing table 73. The default values may be set during manufacturing by a switch manufacturer or a third party. The default values allow a user to use one or more switch port.

In step S202 the switch is initialized in a network system. Switch firmware reads port-licensing values in step S203 and determines if there are any licensing values set. If no licensing values are set in licensing table 73, then the switch is considered fully licensed. The switch operates as a fully licensed switch in step S204 and the process moves to step S207, described below. The term "fully licensed" is used to indicate that a user can use all the ports.

In step S203, if some of the licensing values are set in the licensing table 73 or if a change in the configuration of the port licenses is desired, then software management application 71A is launched in step S205. Software management application 71A, as shown in FIG. 1E, is used to send commands to switch 71 to configure/reconfigure the port licensing in switch 71.

In step S206, port licenses are reconfigured as described in detail below with respect to FIG. 2B.

Thereafter, in step S207, devices 68 are attached to the licensed ports 70.

In step S208, traffic is routed to the devices attached to the licensed ports 70 in switch 71.

Figure 2B:
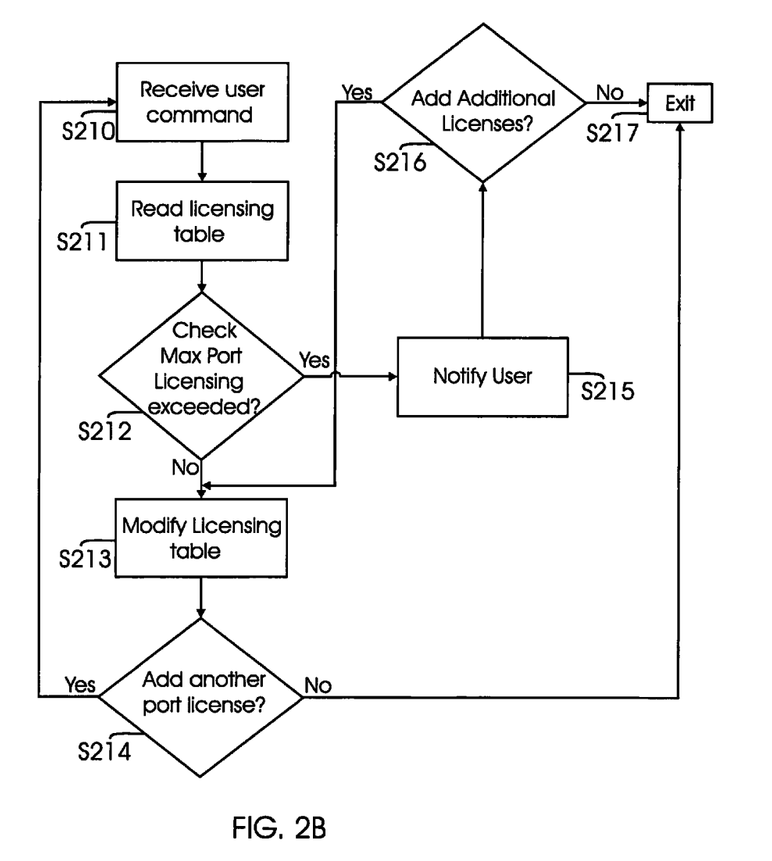
FIG. 2B shows a flow chart for re-configuring port licenses in a switch, according to one aspect of the present invention.

Reconfiguration Process Flow:

FIG. 2B shows a flow chart for re-configuring port licenses in a switch, according to one aspect of the present invention.

In step S210, after software management application 71A is launched, a user sends a command to switch 71 firmware for configuring a particular port as a licensed port. The command may be sent using a graphical user interface or a command line interface.

In step S211, switch 71 firmware reads the licensing table 73. In step S212, the firmware determines if the maximum number of port licenses will be exceeded with the addition of the license per user request.

If the maximum number of port licenses is not exceeded, then in step S213, firmware modifies licensing table 73 to add/configure the port as a licensed port. Thereafter, the user is allowed to use the port.

In step S214, if there are no more ports to be licensed, the process ends in step S217 and returns to step S207 of the main process flow as described in FIG. 2A. If more ports need to be licensed, the process restarts at step S210.

If the maximum number of port licenses is exceeded in step S212, then the user is notified S215 by software management application 71A to add (i.e. purchase) additional licenses in step S216.

Additional port licenses can be added by modifying licensing table 73 in step S213, if the user purchases additional License Keys. Licensing table 73 is updated and stored in system memory 72.

If the user does not purchase additional license keys in step S216, the process exits and returns to step S207 of the main process flow as described above with respect to FIG. 2A.

Figure 3:
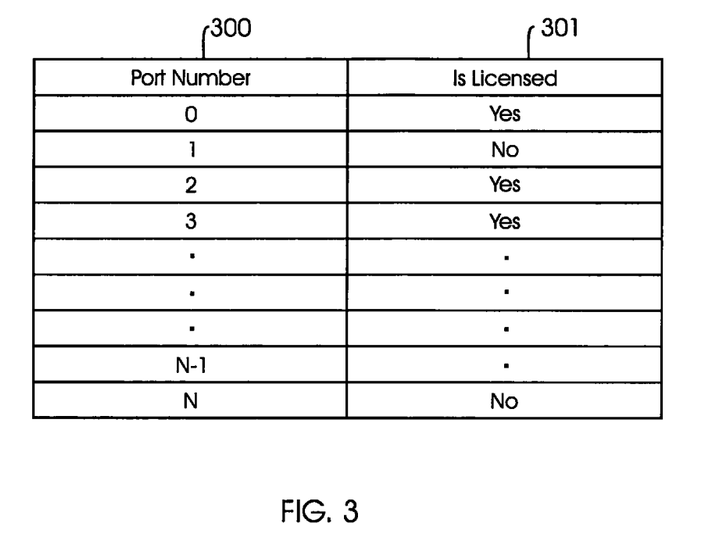
FIG. 3 shows a licensing table that maintains information about port licenses in a switch, according to one aspect of the present invention.

Licensing Table:

FIG. 3 shows an example of licensing table 73, which maintains information regarding port licenses in switch 71. Licensing table 73 is maintained in system memory 72 which is accessible by the firmware. Each entry in licensing table 73 has a port number and its associated licensing information. Licensing table 73 is comprised of a column 300 that includes the port number and a column 301 that has the corresponding license information for the port. The entries in column 301 are a "yes" if the associated port is licensed and a "no" if the associated port is not licensed. Firmware modifies entries in column 301 to a "yes" if a license is added to a port.

It is noteworthy that port-licensing values can be stored in any format in system memory 72 and the term "table" is not to be construed as a limitation.

Figure 4A:
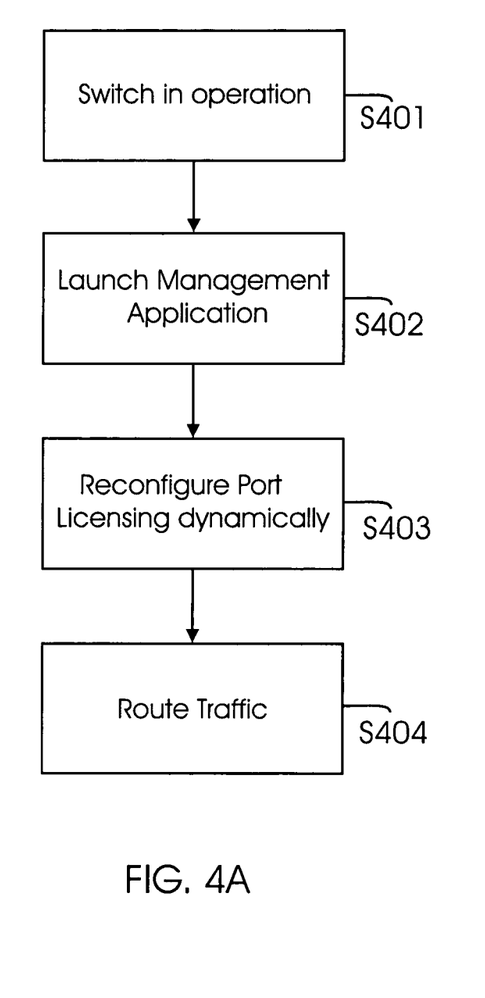
FIG. 4A shows an overall top-level flow chart for dynamically configuring port licenses in a switch, according to one aspect of the present invention.

Dynamic Port Licensing Configuration Process Flow:

FIG. 4A shows a top-level flow diagram for dynamically configuring port licenses in switch 71, according to one aspect of the present invention. The term dynamic in this context means that the devices are already attached to a switch and the switch is operational. Turning in detail to FIG. 4A, in step S401, switch 71 is in operation in a network system.

In step S402, software management application 71A is launched if a change in port license configuration is desired.

In step S403, port licenses are reconfigured using the process described below with respect to FIG. 4B. In step S404, data is routed to all devices 68 that are attached to licensed ports 69.

Figure 4B:
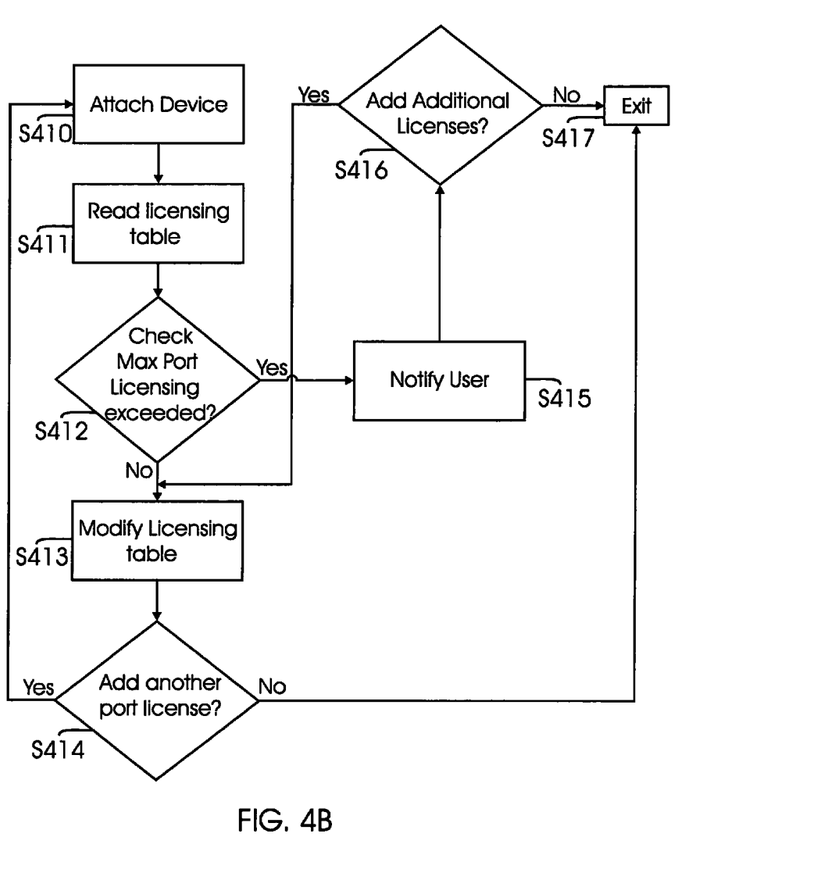
FIG. 4B shows a flow chart diagram for dynamically re-configuring port licenses in a switch, according to one aspect of the present invention.

Dynamic Port Licensing Reconfiguration Process Flow:

FIG. 4B shows a flow chart for dynamically re-configuring port licenses in a switch according to one aspect of the present invention.

In step S410, a device(s) is/are attached to switch 71. Switch code firmware automatically detects the new device and subsequently reads licensing table 73 in step S411.

In step S412, the firmware determines if the maximum number of port licenses is exceeded with the addition of a new license for the attached device(s).

If the maximum number of port licenses is not exceeded, then in step S413 firmware modifies licensing table 73. Thereafter, the user is allowed to use the port.

In step S414, if there are no more ports to be licensed, then in step S417 the process exits and returns to step S404 of the main process flow as described with respect to FIG. 4A. If more ports need to be licensed, the process restarts at step S410.

If the maximum number of port licenses is exceeded after the addition of the port in step S412, the user is notified in step S415 by software management application 71A. The user then makes a decision in step S416 to add new license(s). Additional port licenses can be added by modifying licensing table 73 in step S413, if the user has purchased additional license keys. The updated maximum number of port licenses is stored in system memory 72 for future comparison.

If the user does not purchase additional license keys in step S416, the process exits and returns to step S404 of the main process flow as described with respect to FIG. 4A.

Reconfiguration Examples

Figure 5A:
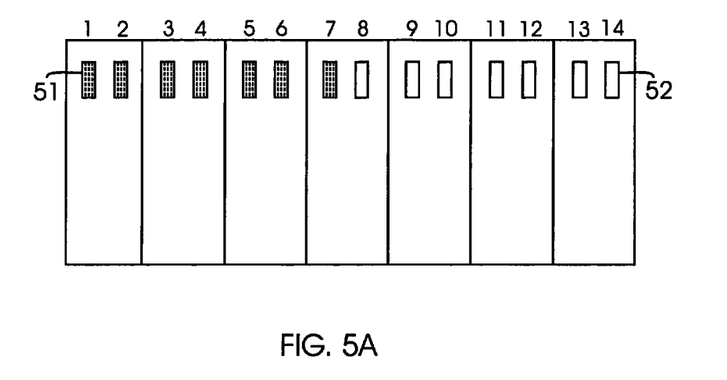
FIG. 5A shows an example of a 14-port switch licensed using conventional port licensing techniques.

FIG. 5A shows an example of a 14-port switch licensed with a conventional port licensing method.

Figure 5B:
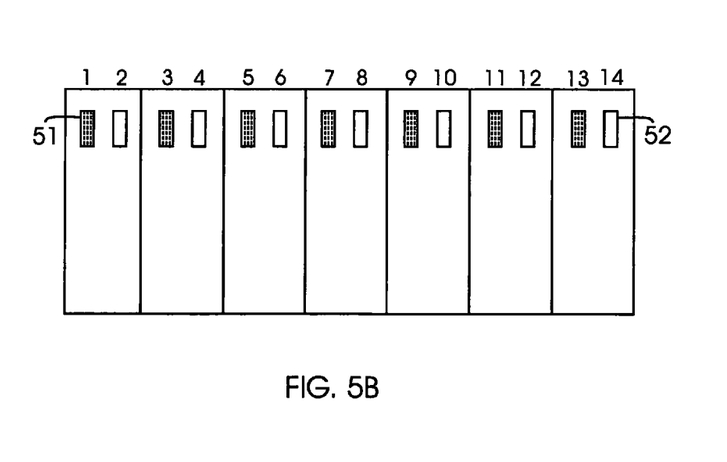
FIG. 5B shows an example of a 14-port switch licensed using the configurable port licensing method, according to one aspect of the present invention.

FIG. 5B shows an example of a 14-port switch licensed with a configurable port licensing method, according to one aspect of the present invention.

The example in FIG. 5A shows a 14-port switch numbered 1 through 14. During manufacturing, half of the ports 51 are licensed and half of the ports 52 are not licensed. In the example shown, lower ports 1 through 7 are licensed and upper ports 8 through 14 are not licensed. Devices, blade servers in this case, can only be attached to licensed ports 1-7.

Blade servers that attach to the switch can be 1×, 2× or 3× wide. Physically, a 1× blade server occupies space for 1 port on the switch, a 2× blade server occupies contiguous port slots on the switch and a 3× blade server occupies 3 contiguous port slots on the switch. Each blade server typically uses 1 license port of the switch.

In the example shown in FIG. 5A, if a 1× blade server is attached to the switch it occupies the slot for port 1 on the switch. If a 2× blade server is attached to the switch, it occupies port slots 1 and 2 on the switch and if a 3× blade server is attached to the switch, it occupies port slots 1, 2 and 3 on the switch.

In the case of 2× blade server, port 2 is unused and the license associated with the port cannot be used for attaching other blade servers. Similarly, the licenses associated with ports 2 and 3 become unusable for a 3× wide blade server. Therefore, the configuration shown in FIG. 5A can accommodate a maximum of 7 1× blade servers connected to the ports 1 though 7 of the switch using 7 port licenses, or a maximum of 4 2× blade servers connected to ports 1, 3, 5, 7 using 4 port licenses or a maximum of 2 3× blade servers connected to ports 1, 5 using 2 port licenses. Due to the static port-licensing configuration of the switch which cannot be changed after manufacturing, the ports are not fully utilized in the case of 2× and 3× blade servers.

According to one aspect of the present invention a user can reconfigure the port licenses of the switch using the process flow described in FIG. 2B or FIG. 4B. After the reconfiguration process, Ports 1, 3, 5, 7, 9, 11, 13 are configured as licensed ports and ports 2, 4, 6, 8, 10, 12, 14 are configured as non licensed ports. The newly configured switch is shown in FIG. 5B.

The reconfiguration process enables the user to connect 2× blade servers into the switch without wasting additional ports of the switch. In the example shown in FIG. 5B, port 1 is licensed and port 2 is not licensed. When a 2× blade server is attached to port 1, it takes up the space for port 1 and port 2 of the switch, but since port 1 is licensed and port 2 is not licensed, only 1 license is used and an additional license is not wasted.

Therefore, with the new configuration, according to one aspect of the present invention, 7 2× blade servers or 7 1× blade servers or a combination of both, can be attached to ports 1, 3, 5, 7, 9, 11 and 13 using all the licenses available. Similarly, the ports can be reconfigured to accommodate a combination of 1×, 2× and 3× blade servers, thereby fully and optimally utilizing the available licenses.

The present invention allows a user to customize port configuration without wasting port licenses. The user can change port license configuration based on user needs and network system architecture.

Although the present invention has been described with reference to specific embodiments, these embodiments are illustrative only and not limiting. Many other applications and embodiments of the present invention will be apparent in light of this disclosure and the following claims.

What is claimed is:

1. A method for configuring port licenses in a switch having a plurality of ports for communication in a network system, comprising:

a switch processor initializing the switch in the network system;

the switch processor reading a memory accessible to the switch to determine if any licensing value is set for the switch, the licensing value indicating whether one or more of the plurality of ports can be used for communication in the network system;

if no licensing value is set, then the switch operates as if all the plurality of ports are licensed;

launching a reconfiguration process for reconfiguring port licenses, if the licensing value is set and upon the switch receiving a command via a processor executable management application for configuring a port of the switch as a licensed port;

launching the management application during the reconfiguration process;

the switch processor reading the licensing table from the switch memory, the licensing table storing licensing information for each of the plurality of ports;

the switch processor checking if a maximum number of port licenses for the user would be exceeded if the license for the port is granted in response to the command; and the switch processor modifying the licensing table for configuring the port as a licensed port, if the maximum number of port licenses would not be exceeded.

2. The method of claim 1, further comprising:

notifying the user via the management application if the maximum number of port licenses would be exceeded, if the license was granted in response to the command; and providing an option via the management application for adding an additional license by acquiring an additional licensing key for the port and if the additional license key is acquired, then the switch processor modifies the licensing table to reflect the additional license key for using the port.

3. The method of claim 1, wherein the switch is a fibre channel switch.

4. The method of claim 1, wherein the switch is a non-fibre channel switch.

5. A method for dynamically configuring port licenses in a switch having a plurality of ports for communication in a network system, comprising:

launching a port configuration process for reconfiguring a license for a port of the switch element while the switch is operating in the network system and a device is attached to the port;

launching the management application during the configuration process;

a switch processor reading a licensing table stored in a memory accessible to the switch, the licensing table storing licensing information for the plurality of ports;

after reading the licensing table, the switch processor checking if a maximum number of port licenses would be exceeded if the license to use the port during the configuration process is granted; and if the maximum number of port licenses would not be exceeded, then the switch processor modifying the licensing table for configuring the port as a licensed port.

6. The method of claim 5, further comprising:

notifying a user if the maximum number of port licenses would be exceeded; and providing an option via the management application for adding an additional license by acquiring an additional licensing key for the port and if the additional license key is acquired, then the switch processor modifies the licensing table to reflect the additional license key for using the port.

7. The method of claim 5, wherein the switch is a fibre channel switch.

8. The method of claim 5, wherein the switch is a non-fibre channel switch.

* * * * *

UNITED STATES PATENT AND TRADEMARK OFFICE
CERTIFICATE OF CORRECTION

| | | |
|---|---|---|
| PATENT NO. | : 8,682,799 B1 | Page 1 of 1 |
| APPLICATION NO. | : 11/318116 | |
| DATED | : March 25, 2014 | |
| INVENTOR(S) | : Jeffrey E. Henning et al. | |

It is certified that error appears in the above-identified patent and that said Letters Patent is hereby corrected as shown below:

On the Title page, in item (75), under "Inventors", in column 1, line 3, delete "Eden Priarie, MN" and insert -- Eden Prairie, MN --, therefor.

In the Specification

In column 7, line 28, delete "contiguous" and insert -- 2 contiguous --, therefor.

Signed and Sealed this
Eighth Day of July, 2014

Michelle K. Lee
*Deputy Director of the United States Patent and Trademark Office*